US006814105B1

United States Patent
Crim, Jr.

(10) Patent No.: US 6,814,105 B1
(45) Date of Patent: Nov. 9, 2004

(54) DUCT INSULATION HAVING CONDENSATE WICKING

(75) Inventor: Charles W. Crim, Jr., Lakeville, MN (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 4 days.

(21) Appl. No.: 10/448,757

(22) Filed: May 30, 2003

(51) Int. Cl.[7] .............................. F16L 9/14; B32B 1/08
(52) U.S. Cl. ..................... 138/149; 138/167; 138/156; 428/36.9; 428/99; 156/310; 156/215
(58) Field of Search ............................ 138/149, 156, 138/167, 110; 428/36.9, 99, 36.1; 156/310, 215

(56) References Cited

U.S. PATENT DOCUMENTS

| 4,265,953 | A | * | 5/1981 | Close ........................... 428/78 |
| 4,846,264 | A | * | 7/1989 | Hata ...................... 165/104.27 |
| 4,946,732 | A | | 8/1990 | Cohen et al. ................ 428/192 |
| 5,325,893 | A | | 7/1994 | Takagi et al. ................ 138/143 |
| 5,441,083 | A | | 8/1995 | Korsgaard .................. 138/149 |
| 5,569,513 | A | * | 10/1996 | Fidler et al. ............... 428/35.6 |
| 5,690,147 | A | | 11/1997 | Cridland et al. ............ 138/149 |
| 5,750,225 | A | | 5/1998 | Petty .......................... 428/362 |
| 5,848,509 | A | | 12/1998 | Knapp et al. .......... 428/36.1 X |
| 6,026,863 | A | * | 2/2000 | Korsgaard .................. 138/149 |
| 6,231,704 | B1 | | 5/2001 | Carpinetti ............... 138/149 X |
| 6,444,289 | B1 | | 9/2002 | Ernest ......................... 428/138 |
| 6,635,322 | B1 | * | 10/2003 | Korsgaard ................. 428/34.5 |
| 6,688,338 | B2 | * | 2/2004 | Meli et al. .................. 138/123 |
| 2001/0031329 | A1 | | 10/2001 | Shaffer ..................... 428/99 X |
| 2001/0033926 | A1 | | 10/2001 | Matthews et al. ....... 428/316.6 |
| 2004/0079431 | A1 | * | 4/2004 | Kissell ....................... 138/149 |

* cited by examiner

Primary Examiner—Patrick Brinson
(74) Attorney, Agent, or Firm—Inger H. Eckert; Maria C Gasaway (57) ABSTRACT

An insulated duct assembly includes an elongated duct, an insulation blanket, at least one sheet of escape wick material and a tape layer. The insulation blanket has an inner wicking layer. The insulation blanket is applied to the elongated duct so as to create a seam aligned longitudinally with respect to the duct. The seam is defined by first and second edges of the insulation blanket. The at least one sheet of escape wick material is disposed along at least one edge of the insulation blanket. The at least one sheet of escape wick material has a "C" shaped cross-section surrounding the at least one edge of the insulation blanket. The tape layer is disposed along and covers the seam.

14 Claims, 6 Drawing Sheets

DUCT INSULATION HAVING CONDENSATE WICKING

TECHNICAL FIELD

This invention relates generally to a method and apparatus for insulating ducts for use in heating, ventilating, and air conditioning applications. More particularly, this invention pertains to an insulating process and apparatus involving duct insulation having condensate wicking.

BACKGROUND OF THE INVENTION

Generally, heating, ventilating, and air conditioning (HVAC) systems include such equipment as air handling units and air ducts. Typically, HVAC systems are provided with duct insulation for thermal and/or acoustic purposes. Conventional duct insulation used in HVAC systems typically includes a facing layer adhered to an insulation layer. The duct insulation is installed with the facing layer of the duct insulation positioned away from the air duct. Occasionally, water vapor may condense on the air duct. The facing layer is typically non-porous such that the facing surface acts as a barrier between the insulation body and the external environment. As such, the duct insulation is not conducive to the escape or dissipation of the condensed water vapor on or within the insulation layer. Even when the duct insulation is unfaced the condensed water vapor may remain on the duct surface or trapped in the insulation layer. As a result, damage may be caused by the condensed water vapor to the air duct, the insulation layer, or the facing layer.

SUMMARY OF THE INVENTION

According to this invention there is provided an insulated duct assembly having an elongated duct, and an insulation blanket having a inner wicking layer, the insulation blanket being applied to the elongated duct so as to form a seam aligned longitudinally with respect to the duct, the seam being defined by first and second edges of the insulation blanket. At least one sheet of escape wick material is disposed along the first edge of the insulation blanket. The first escape wick material has a "C" shaped cross-section surrounding the first edge of the insulation blanket. A tape layer is disposed along and covering the seam.

According to this invention there is also provided, in combination, an elongated duct, an insulation blanket, and an elongated sheet of escape wick material. The sheet of escape wick material has first and second edges and a surface, with the surface having at the first edge a strip of adhesive material, and with the surface having at the second edge a strip of adhesive material.

According to this invention there is also provided a method of forming an insulated duct assembly including wrapping an elongated duct with an insulation blanket, with the insulation blanket having an inner wicking layer. The inner wicking layer is at least partially in contact with the elongated duct, and the insulation blanket is applied to the elongated duct so as to form a seam aligned longitudinally with respect to the duct, the seam being defined by first and second edges of the insulation blanket. At least one sheet of escape wick material is adhered to the inner wicking layer at the first edge of the insulation blanket. The at least one sheet of escape wick material is adhered to an outer surface of the insulation blanket at the first edge, ands then disposed along the first edge of the insulation blanket. A tape layer is adhered to the outer surface of the insulation blanket near the first edge of the insulation blanket, and the tape layer is adhered to the outer surface of the insulation blanket near the second edge of the insulation blanket, the tape layer being disposed along the seam.

According to this invention there is also provided a sheet of escape wick material having first and second surfaces and first and second edges. A first adhesive strip is applied to the first surface at the first edge and a second adhesive strip is applied to the first surface at the second edge. The sheet of escape wick material is moldable to be formed around edges of an insulation blanket.

Various objects and advantages of this invention will become apparent to those skilled in the art from the following detailed description of the preferred embodiment, when read in light of the accompanying drawings.

DETAILED DESCRIPTION OF THE INVENTION

Figure 1:
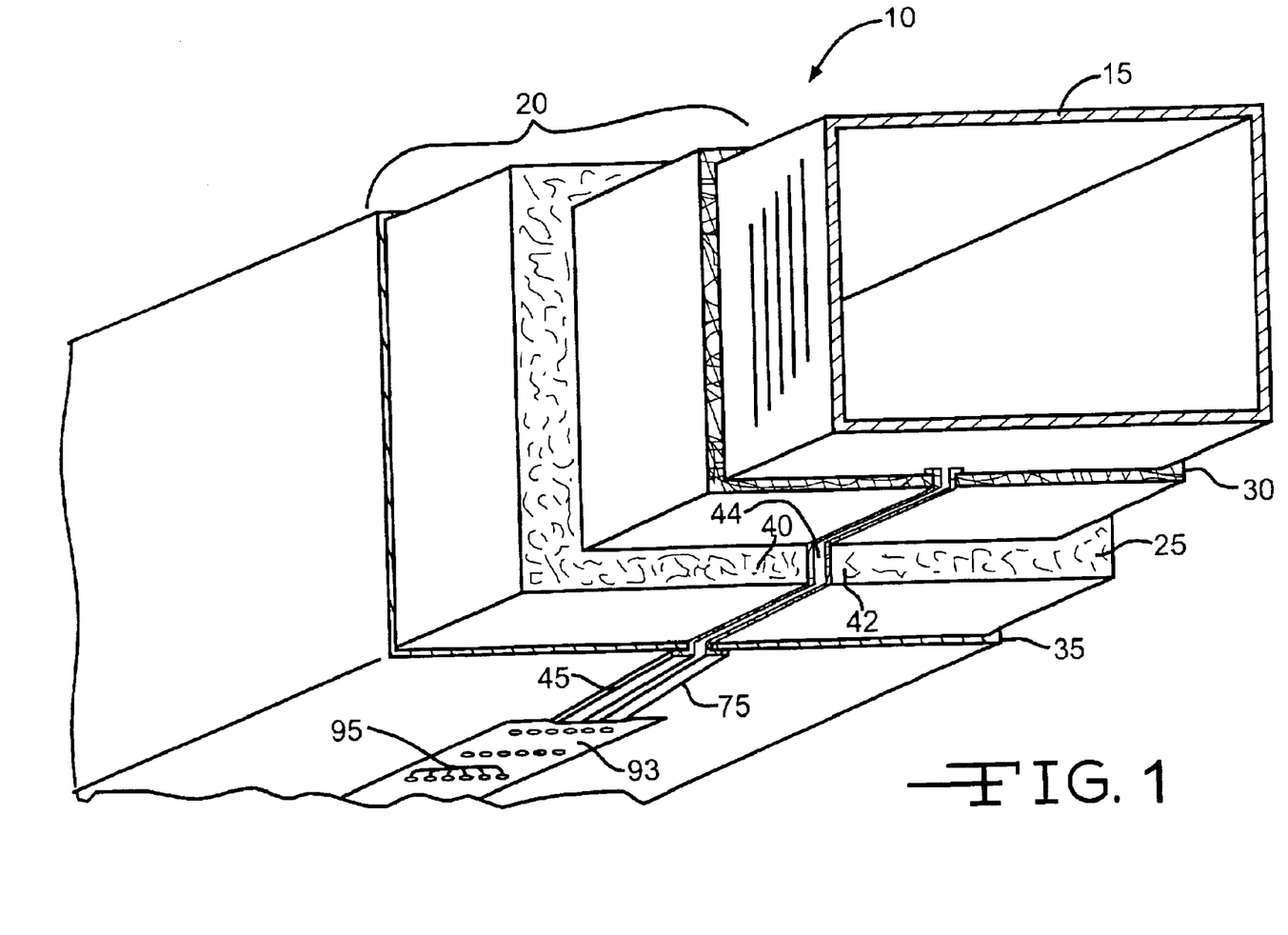
FIG. 1 is a schematic partially cut away view in perspective of an insulated duct assembly in accordance with this invention.
Figure 2:
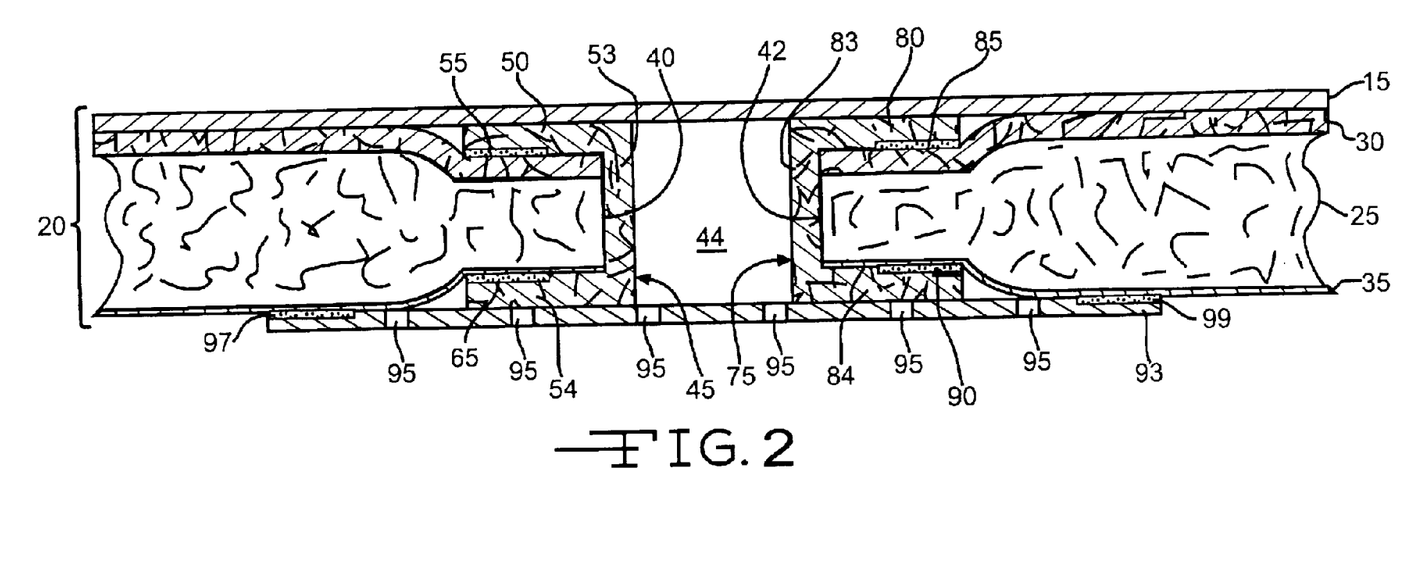
FIG. 2 is a schematic cross-sectional view of a portion of the insulated duct assembly of FIG. 1.

As shown in FIGS. 1 and 2, an insulated duct assembly is illustrated, indicated generally at 10. The insulated duct assembly 10 includes an elongated duct 15. The elongated duct 15 is a typical sheet metal duct. However it will be appreciated that the elongated duct 15 may be any duct suitable for transporting air.

A laminated insulation blanket, indicated at 20, surrounds the elongated duct 15. The laminated insulation blanket 20 has an insulation material layer 25 composed of compressible fiberglass insulation. While the insulation material layer 25 is described as being composed of compressible fiberglass insulation, it will be appreciated that the insulation material layer 25 can be composed of any suitable material for insulating the elongated duct 15. For example, other mineral fibers could be used.

The laminated insulation blanket 20 has an inner wicking layer 30, which is at least partially in contact with the elongated duct 15, so that when water vapor condenses on the elongated duct 15, the condensed water vapor is drawn into the inner wicking layer 30. The inner wicking layer 30 has an affinity for liquids, and the layer transports liquid water away from the surface of the duct 15. Also, condensed water within the inner wicking layer will migrate from areas of higher concentration of water to areas of lower concentration. Although the inner wicking layer 30 is shown as separate from the insulation material layer 25, it will be appreciated that the inner wicking layer 30 may be formed integrally within the insulation material layer 25. Therefore, as an alternative to a laminated insulation blanket 20, a non-laminated insulation blanket having wicking material integrated into the interior side of the layer 30 may alternately be used as the insulation for the elongated duct 15. The inner wicking layer 30 is preferably composed of a non-woven wick material, such as, for example, a non-woven nylon fabric. It will be appreciated, however, that the inner wicking layer 30 may be composed of any material suitable for drawing and transporting the condensed water vapor.

Preferably, the laminated insulation blanket 20 has an outer facing layer, such as an outer Foil Reinforced Kraft (FRK) layer 35. It will be appreciated, however, that the laminated insulation blanket 20 may have any suitable outer facing layer, such as an outer foil layer or an outer kraft layer, or the laminated insulation blanket may be unfaced.

The laminated insulation blanket 20 has a first edge 40 and a second edge 42, which form a seam 44. Although the insulated duct assembly 10 is shown as having a gap present at the seam 44, it will be appreciated that the first and second edges 40, 42 can be in contact with each other, thereby precluding a gap at the seam 44. The seam 44 is aligned longitudinally along the elongated duct 15 and preferably placed on the bottom of the insulated duct assembly 10.

Figure 5:
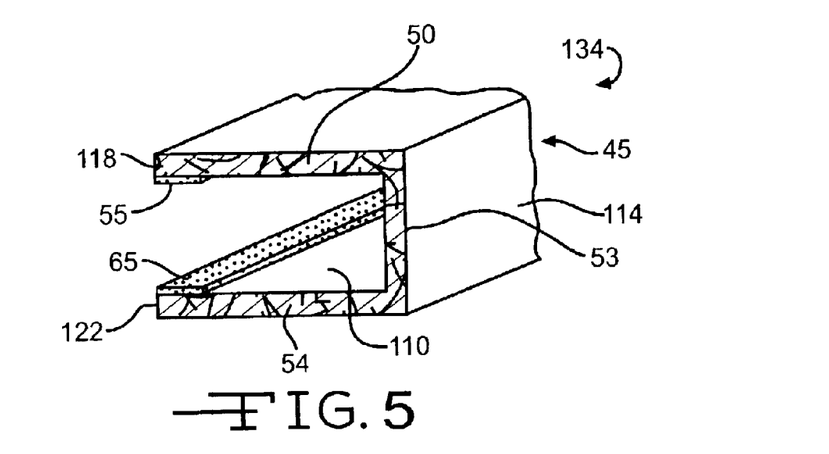
FIG. 5 is a schematic end perspective view of the sheet of escape wick material of FIG. 4 in a "C" shaped form.

A first sheet of escape wick material 45, which has a "C" shaped cross-section, is disposed along the first edge 40 of the laminated insulation blanket 20 at the seam 44. As shown in FIGS. 2 and 5, the first sheet of escape wick material 45 has an inner leg 50, a mid-section 53, and an outer leg 54. The inner leg 50 is adhesively connected to the inner wicking layer 30 by a first strip of adhesive 55. It will be appreciated that the inner leg 50 could otherwise be secured in the insulated duct assembly 10. For example, the inner leg 5 may alternately or additionally be adhesively connected to the elongated duct 15. The outer leg 54 is adhesively connected to the outer FRK layer 35 by a second strip of adhesive 65.

A second sheet of escape wick material 75, which has a "C" shaped cross-section, is disposed along the second edge 42 of the laminated insulation blanket 20 at the seam 44. The second sheet of escape wick material 75 has an inner leg 80, a midsection 83, and an outer leg 84. The inner leg 80 is adhesively connected to the inner wicking layer 30 by a first strip of adhesive 85. It will be appreciated that the inner leg 80 could otherwise be secured in the insulated duct assembly 10. For example, the inner leg 80 may alternately or additionally be adhesively connected to the elongated duct 15. The outer leg 84 is adhesively connected to the outer FRK layer 35 by a second strip of adhesive 90.

Although the first and second sheets of escape wick material 45 and 75 are described as being adhesively connected the laminated insulation blanket 20, it will be appreciated that the first and second sheets of escape wick material 45 and 75 could be connected to the laminated insulation blanket 20 by any other suitable means, such as, for example, by strips of hook and loop fabric.

The condensed water vapor that is drawn into the inner wicking layer 30 migrates to the first and second sheets of escape wick material 45 and 75 through the inner legs 50 and 80. The condensed water vapor then migrates from the inner legs 50 and 80 through the mid-sections 53 and 83 and to outer legs 54 and 84. Preferably, the first and second sheets of escape wick material 45 and 75 are composed of the same material as the inner wicking layer 30. It will be appreciated, however, that the first and second sheets of escape wick material 45 and 75 may be composed of any suitable wicking material.

A tape layer 93, which secures the laminated insulation blanket 20 around the elongated duct 15, covers the seam 44. The tape layer 93 is adhesively connected to the outer FRK layer 35 near the first edge 40 by a first strip of adhesive 97. The tape layer 93 is adhesively connected to the outer FRK layer 35 near the second edge 42 by a second strip of adhesive 99. The tape layer 93 thus bonds the first edge 40 and the second edge 42 together and secures the laminated insulation blanket 20 around the elongated duct 15. It will be appreciated, however, that any other type of connection suitable for securing the laminated insulation blanket 20 may be used, such as, for example, nylon straps, hook and loop strips, fasteners, and zip ties.

The tape layer 93 has evaporation holes 95. The condensed water vapor that migrates to the first and second sheets of escape wick material 45 and 75 migrates through the evaporation holes 95 from the outer legs 54 and 80. The condensed water vapor thereby escapes into the external environment. As such, the condensed water vapor does not remain on the surface of the elongated duct 15 or trapped in the insulation material layer 25. As a result, the potential for damage to the elongated duct 15, insulation material layer 25 or the outer FRK layer 35 caused by the condensation of water vapor is greatly reduced. This will inhibit corrosion of the elongated duct 15, deterioration of the insulating value of the insulation material layer 25 and growth of undesired organisms, such as bacteria or mold, in the insulated duct assembly 10. The evaporation holes can be of any configuration, including slits, suitable for allowing the evaporation of water vapor from the insulation blanket 20.

Figure 3:
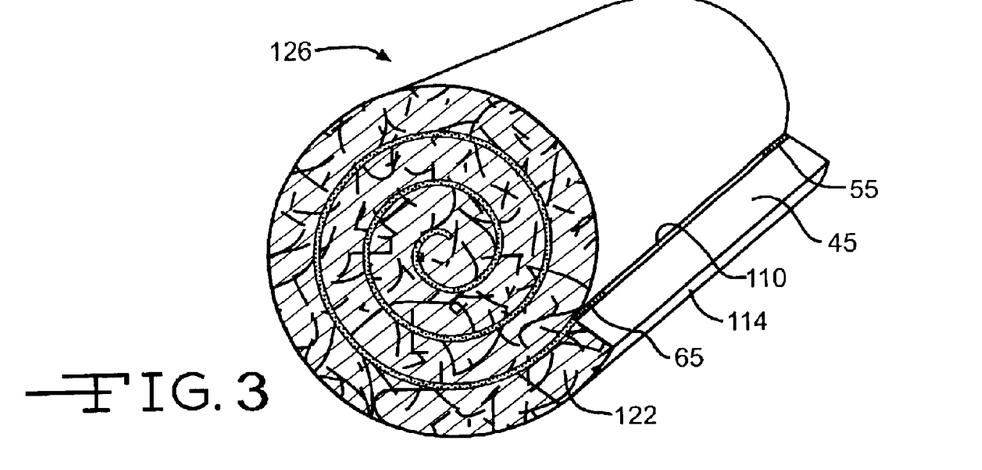
FIG. 3 is a schematic side perspective view of a roll of escape wick material.
Figure 4:
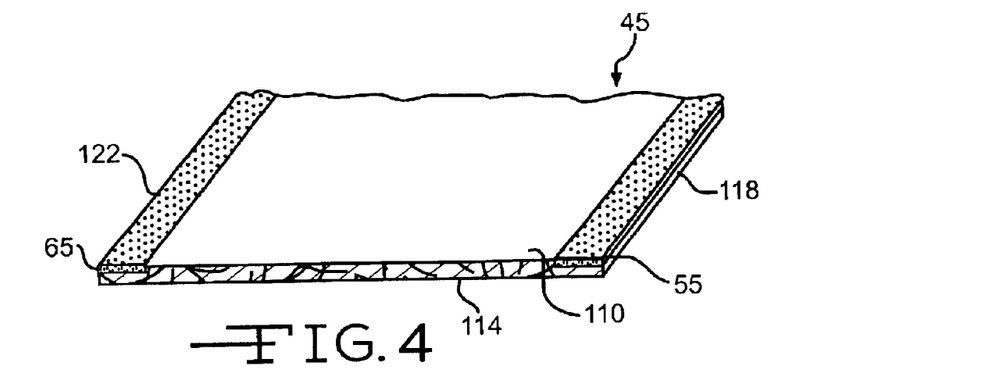
FIG. 4 is a schematic end perspective view of a sheet of the escape wick material of FIG. 3 unrolled.

Now referring to FIGS. 3, 4, and 5 the first sheet of escape wick material 45 is shown. The first sheet of escape wick 45 material has first and second surfaces 110 and 114 and first and second edges 118 and 122. The first and second strips of adhesive 55 and 65 are adhesively connected to the first sheet of escape wick material 45 on the first surface 1O along the first and second edges 118 and 122 respectively.

FIG. 3 illustrates the first sheet of escape wick material 45 with the first and second adhesive strips 55 and 65 in the form of a wick roll 126. The first sheet of escape wick material 45 with the first and second adhesive strips 55 and 65 has been formed into the wick roll 126 for ease of storage and transport. It will be appreciated, however, that the first sheet of escape wick material 45 with the first and second adhesive strips 55 and 65 need not be formed as the wick roll 126, and can be stored and transported in other configurations.

The wick roll 126 has been prepared in such a way as for the first adhesive strip 55 and the second adhesive strip 65 not to adhere to the second side 114. Preferably the first adhesive strip 55 and the second adhesive strip 65 have removable non-stick strips or release strips. However, it will be appreciated that the wick roll 126 may be prepared in any other suitable way, such as incorporating a non-stick treatment or layer along portions of the surface 114 where the first adhesive strip 55 and the second strip 65 may touch.

FIG. 4 illustrates the first sheet of escape wick material 45 with the first and second adhesive strips 55 and 65 in the form of an unrolled flat sheet. The unrolled flat sheet is shown without the optional removable non-stick strips. It will be appreciated that during the installation process of the insulated duct assembly 10 the unrolled flat sheet may be cut in order to properly to size the laminated insulation blanket 20 to the duct 15. This cutting may result in a new first edge 40 or second edge 42.

FIG. 5 illustrates the first sheet of escape wick material 45 with the first and second adhesive strips 55 and 65 configured in the "C" shaped form. Configured in the "C" shaped form, the first sheet of escape wick material 45 includes the inner leg 50, the mid-section 53, and the outer leg 54. The first sheet of escape wick material 45, which is formed of a moldable, i.e., flexible and/or foldable, material, is configured in the "C" shaped form by folding or molding the first and second edges 118 and 122 over the first edge 40.

It will be appreciated that once the first sheet of escape wick material 45 with the first and second adhesive strips 55 and 65 is configured in the "C" shaped form, it may be installed on the laminated insulation blanket 20, i.e., around the first edge 40. Alternatively, the first sheet of escape wick material 45 may be configured in the "C" shaped form as the first sheet of escape wick material 45 is being installed on the laminated insulation blanket 20.

Figure 6:
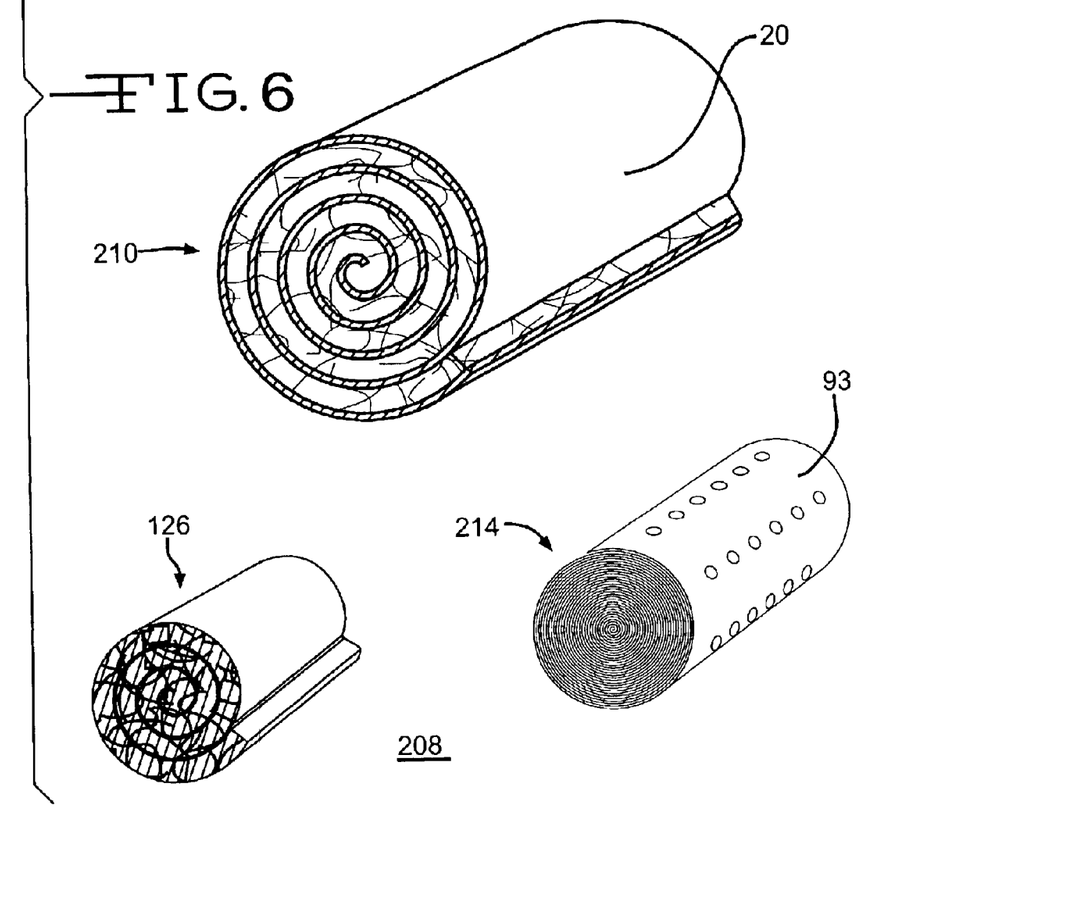
FIG. 6 illustrates the combination of an elongated duct, a roll of a laminated insulation blanket having an inner wicking layer, a roll of escape wick material and a roll of tape.

As shown in FIG. 6, a duct insulation kit or combination 208 for insulating a duct 15, includes the laminated insulation blanket 20 in the form of a blanket roll 210, the wick roll 126, as shown in FIG. 3, and the tape layer 93 in the form of a tape roll 214. It will be appreciated that an installer (not shown) or any other suitable person may assemble the kit or combination 208 onto a duct 15 to form into the insulated duct assembly 10 as shown in FIG. 1. For example, the combination 208 may be assembled into the insulated duct assembly 10 by unrolling the blanket roll 210 and cutting the laminated insulation blanket 20 to the size of the elongated duct 15, both length and width (circumference). The elongated duct 15 is then wrapped with the laminated insulation blanket 20. The wick roll 126 is unrolled, and the first and second sheets of escape wick material 45 and 75 are cut to length. The first and second sheets of escape wick material arc installed over the first and second edges 40 and 42 of the laminated insulation blanket 20, removing the optional non-stick strips if included. The resulting configuration of the first and second sheets of escape wick material 45 and 75 is a "C" shaped form. Then the tape roll 214 is unrolled and the tape layer 93 is cut to length. The tape layer 93 is placed on the laminated insulation blanket 20, spanning the seam 44, and adhered to outer FRK layer 35 near the first and second edges 40 and 42 of the laminated insulation blanket 20.

Figure 7:
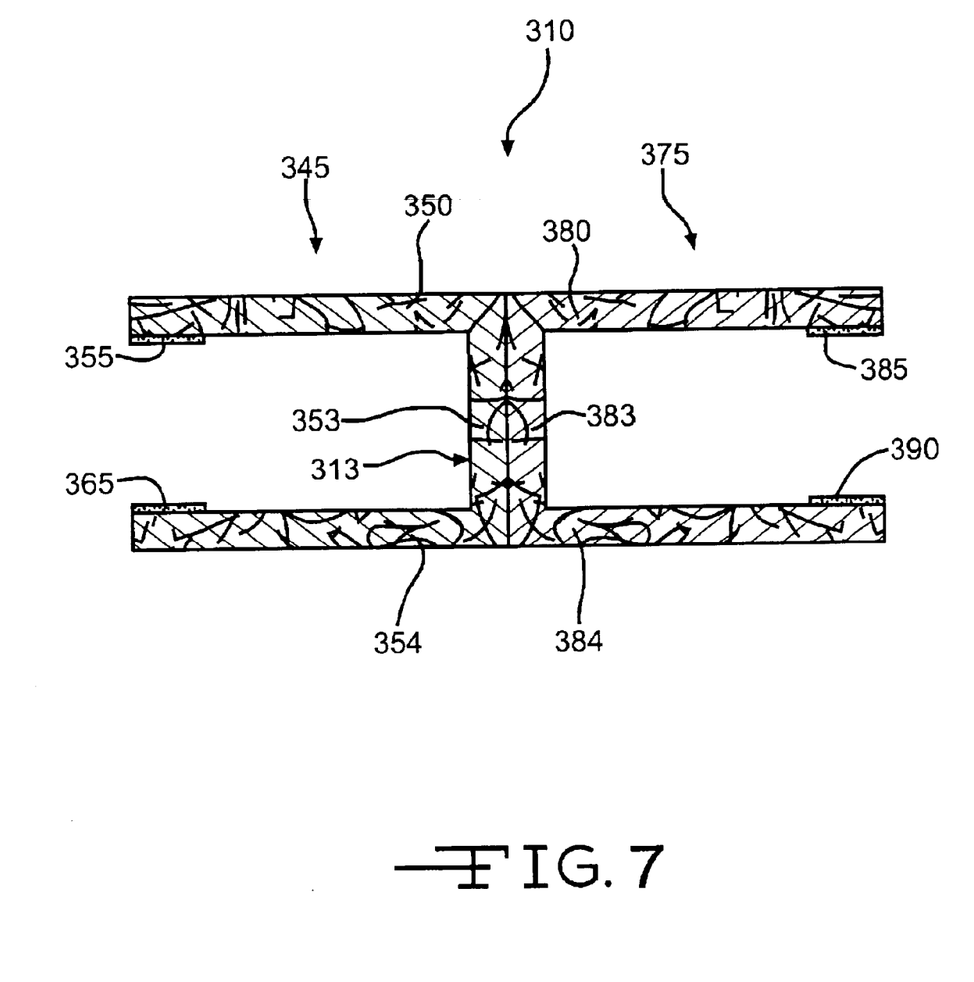
FIG. 7 is a schematic cross-sectional view of an escape wick material assembly in accordance with another embodiment of this invention.

FIG. 7 illustrates an alternate embodiment of the escape wick material. An escape wick material assembly 310 includes the first and second sheets of escape wick material 345 and 375, each configured in the "C" shaped form. The first and second sheets of escape wick material 345 and 375 abut at the mid-sections 353 and 383 and thus are configured in an "I" shaped form. For example, the escape wick material assembly 310 may be formed when the insulated duct assembly 10 is assembled without having a gap present at the seam 44. Alternately the escape wick material assembly 310 may be formed before incorporation within the insulated duct assembly 10. As shown, the first and second sheets of escape wick material 345 and 375 are joined at the mid-sections 353 and 383 to form a shared wall 313. Alternatively, the first and second sheets of escape wick material 345 and 375 may be formed integrally as a single unit. When the first and second sheets of escape wick material 345 and 375 are formed integrally as a single unit, the shared wall 313 acts as both the mid-section 353 of the first sheet of escape wick material 345 and the mid-section 383 of the second 25 sheet of escape wick material 375. Inner legs 350 and 380 have respective adhesive strips 355 and 385. Outer legs 354 and 384 have respective adhesive strips 365 and 390.

Figure 8:
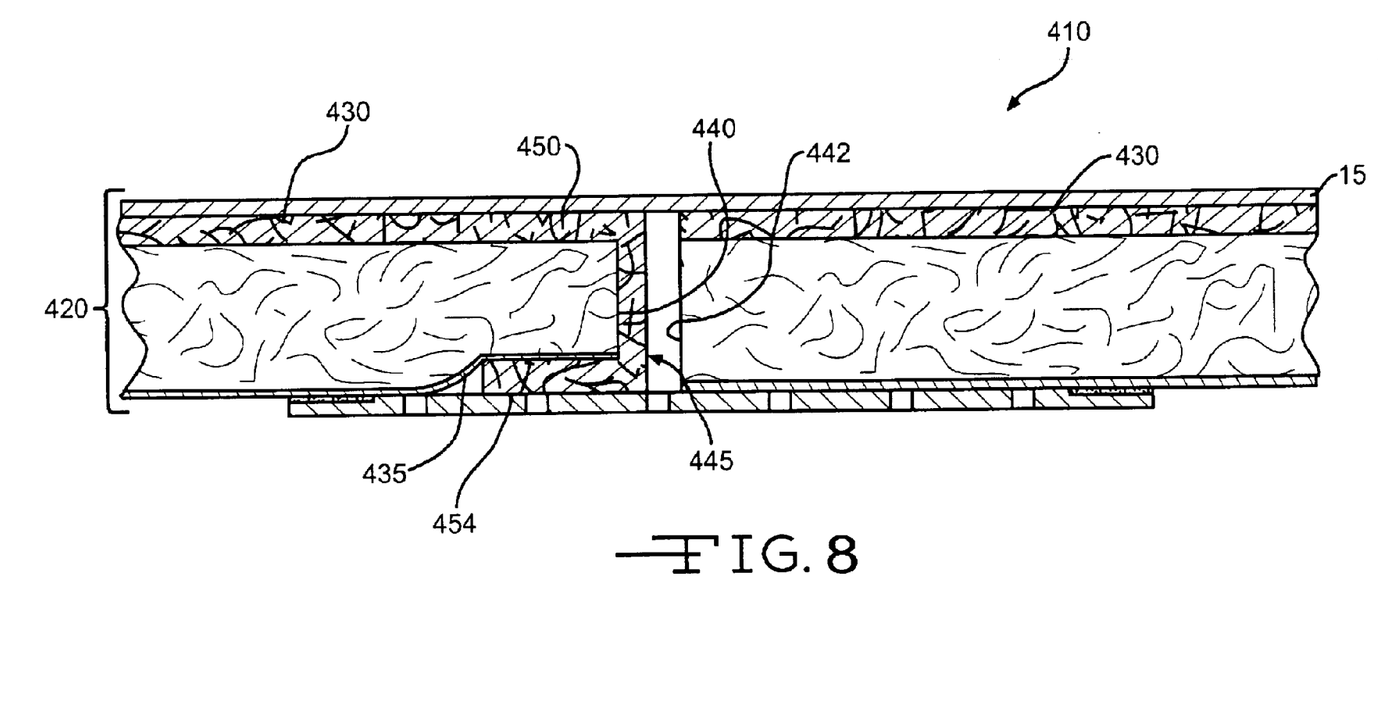
FIG. 8 is a schematic cross-sectional view of a portion of an insulated duct assembly with an integrated sheet of escape wick material in accordance with this invention.

FIG. 8 illustrates another embodiment of the invention where an insulated duct assembly 410, which is similar to the insulated duct assembly 10 shown in FIGS. 1 and 2, has an integrated sheet 445 of escape wick material. The integrated sheet 445 of escape wick material is formed integrally with an inner wicking layer 430 of a laminated insulation blanket 420. The integrated sheet 445 of escape wick material is formed in such a way that an inner leg 450 is in the same plane as the inner wicking layer 430. The integrated sheet 445 of escape wick material is disposed around a first edge 440 of the laminated insulation blanket 420, with an outer leg 454 of the sheet 445 disposed along the outer facing layer 435. When the insulated duct assembly 410 is being assembled, if the laminated insulation blanket 420 must be cut to the size of the elongated duct 15, then the laminated insulation blanket 420 should be cut at the unfinished edge 442, rather than the finished edge 440. Although the insulated duct assembly 410 is shown with only one sheet 445 of escape wick material, it will be appreciated that the insulated duct assembly 410 may include the second sheet of escape wick material, not shown.

The principle and mode of operation of this invention have been described in its preferred embodiments. However, it should be noted that this invention may be practiced otherwise than as specifically illustrated and described without departing from its scope.

What is claimed is:

1. An insulated duct assembly comprising:
   an elongated duct;
   an insulation blanket having a inner wicking layer, the insulation blanket being applied to the elongated duct so as to form a seam aligned longitudinally with respect to the duct, the seam being defined by first and second edges of the insulation blanket;
   at least one sheet of escape wick material, disposed along the first edge of the insulation blanket, the first escape wick material having a "C" shaped cross-section surrounding the insulation blanket and the inner wicking layer at the first edge; and
   a tape layer disposed along and covering the seam.

2. The insulated duct assembly of claim 1 wherein
   a second sheet of escape wick material is disposed along the second edge of the insulation blanket, the second sheet of escape wick material having a "C" shaped cross-section surrounding the insulation blanket and the inner wicking layer at the second edge.

3. The insulated duct assembly of claim 1 wherein the "C" shaped sheet of escape wick material has inner and outer legs, with the inner leg adhesively connected to the inner wicking layer, and the outer leg adhesively connected to an outer surface of the insulation blanket.

4. The insulated duct assembly of claim 1 wherein the tape layer has evaporation holes.

5. The insulated duct assembly of claim 2 wherein the tape layer covers the first and second sheets of escape wick material.

6. The insulated duct assembly of claim 1 wherein the tape layer is adhesively connected to an outer surface of the insulation blanket.

7. The insulated duct assembly of claim 1 wherein the tape layer connects the first and second edges thereby securing the insulation blanket to the duct.

8. The insulated duct assembly of claim 1 wherein the insulation blanket has an outer kraft layer.

9. The insulated duct assembly of claim 1 wherein the insulation blanket has an outer foil surface.

10. A method of forming an insulated duct assembly comprising:

wrapping an elongated duct with an insulation blanket, the insulation blanket having an inner wicking layer, the inner wicking layer at least partially in contact with the elongated duct, the insulation blanket being applied to the elongated duct so as to form a seam aligned longitudinally with respect to the duct, the seam being defined by first and second edges of the insulation blanket;

adhering at least one sheet of escape wick material to the inner wicking layer at the first edge of the insulation blanket;

adhering the at least one sheet of escape wick material to an outer surface of the insulation blanket at the first edge, the at least one sheet of escape wick material being disposed along the first edge of the insulation blanket;

adhering a tape layer to the outer surface of the insulation blanket near the first edge of the insulation blanket; and adhering the tape layer to the outer surface of the insulation blanket near the second edge of the insulation blanket, the tape layer being disposed along the seam.

11. The method of claim 10 further including adhering a second sheet of escape wick material to the inner wicking layer at the second edge; and adhering the second sheet of escape wick material to the outer surface of the insulation blanket at the second edge, the second sheet of escape wick material being disposed along the second edge of the insulation blanket.

12. The method of claim 10 wherein the method further includes configuring the at least one sheet of escape wick material in a "C" shaped cross-sectional form.

13. The method of claim 10 wherein the method further includes cutting the at least one sheet of escape wick material along the first edge of the insulation blanket to the size of the duct.

14. The method of claim 10 where in the tape layer has evaporation holes.

* * * * *